United States Patent [19]

Defour et al.

[11] Patent Number: 5,282,073
[45] Date of Patent: Jan. 25, 1994

[54] SYSTEM OF OPTICAL COMMUNICATIONS BETWEEN MOVING STATIONS AND CORRESPONDING COMMUNICATIONS METHOD

[75] Inventors: Martin Defour, Courbevoie; Georges Coudrec, Bures sur Yvette; Remi Fertala, Suresnes; Benoist Grossmann, Paris, all of France

[73] Assignee: Thomson-CSF, Puteaux, France

[21] Appl. No.: 850,284

[22] Filed: Mar. 12, 1992

[30] Foreign Application Priority Data

Mar. 15, 1991 [FR] France ................. 91 03181

[51] Int. Cl.$^5$ ........................................... H04B 10/00
[52] U.S. Cl. .................... 359/159; 359/152; 359/172; 356/152
[58] Field of Search ........ 359/143, 152, 159, 169–170, 359/172, 193; 356/152; 250/200

[56] References Cited

U.S. PATENT DOCUMENTS

| | | | |
|---|---|---|---|
| 3,511,998 | 5/1970 | Smokler | 359/159 |
| 4,279,036 | 7/1981 | Pfund | 359/112 |
| 4,867,560 | 9/1989 | Kunitsugu | 359/172 |
| 4,928,317 | 5/1990 | Franchini | 359/172 |

FOREIGN PATENT DOCUMENTS

| | | |
|---|---|---|
| 0282399 | 9/1988 | European Pat. Off. . |
| 0325429 | 7/1989 | European Pat. Off. . |
| 2350010 | 11/1977 | France . |
| 2218874 | 11/1989 | United Kingdom . |

OTHER PUBLICATIONS

1985 IEEE Military Communications Conference, Milcom 85, vol. 1, Oct. 20, 1985, Boston, Mass., USA, pp. 94–97, W. A. Seaman, Jr., et al., "Free Space Laser Communication Terminals".

*Primary Examiner*—Herbert Goldstein
*Assistant Examiner*—K. Negash
*Attorney, Agent, or Firm*—Oblon, Spivak, McClelland, Maier & Neustadt

[57] ABSTRACT

In a system of optical communications that can be used by air or space vehicles, each station comprises at least one optical system covering a half space, this system comprising two twinned optical devices to respectively form two distinct reception channels: a first reception optical channel for the initialization, in space, of the direction of communication; a second optical channel for the reception of the contents of the communication. One of the two optical devices is also used to form a transmission channel for the initialization and then for the communication in the direction of communication. The setting up of communication is done in three steps, respectively target designation, iterative bilateral acquisition and interstation communication.

11 Claims, 2 Drawing Sheets

SYSTEM OF OPTICAL COMMUNICATIONS BETWEEN MOVING STATIONS AND CORRESPONDING COMMUNICATIONS METHOD

BACKGROUND OF THE INVENTION

1. Field of the Invention

The field of the invention is that of systems for the transmission of signals between moving stations. More specifically, the invention is aimed at providing an optical linking system that can be used by air or space vehicles, for example to meet the requirements of communications between aircraft or between aircraft and the ground.

2. Description of the Prior Art

The presently existing air communications systems commonly use RF transmission, and have a number of drawbacks. Electromagnetic waves are sensitive to jamming caused by third-party transmissions as well as by transmissions from onboard equipment. Other limitations relate to heavy traffic in the transmission bands available and the small bandwidth that may be allocated to each communication. Finally, electromagnetic waves have the additional drawback of lacking discretion and, in certain situations, of giving vulnerability to aircraft that seek to be undetectable.

It is known that optical links may constitute an advantageous substitute for RF links, notably from the viewpoint of the above limitations. Indeed, the advantage of optical communications is that they have sufficient, but not unnecessarily excessive, range for air applications, have little susceptibility to external aggression and disturbance, including attempts at intrusion, and are discreet. Furthermore, the optical link generally provides for the availability of a high usable passband.

However, the establishment of optical communications between moving stations, notably between air vehicles, entails the combining of means that can be used to cope with the following constraints:

the system should provide directional search means that can be used to carry out an aiming of the transmitter during a phase when the link is initialized, the system should provide quality aiming in order to maintain the link; the servo-control of the linking should notably enable the link to be maintained in spite of the substantial degree of relative motion that may exist among aircraft;

the range of the link should be sufficient to meet operational needs;

after an interruption of a link by a transient masking, it should be possible to reinitialize the link speedily;

the system should comply with the general specifications of equipment in aircraft;

the space occupied by the system should be compatible with its onboard use.

SUMMARY OF THE INVENTION

The aim of the invention is to provide a set of satisfactory solutions that meet these constraints.

This aim, as well as others that shall appear hereinafter, are achieved according to the invention by means of a system of optical communications between two stations, notably between transmission/reception stations on board aircraft, wherein each station has at least one optical system covering a given field and comprising two optical devices twinned so as to respectively form two distinct reception channels:

a first optical reception channel for the initialization, in space, of the direction of communication, comprising a wide-field objective and a detector enabling the direction of communication with another station to be determined;

a second optical reception channel to receive the contents of the communication, the receiving direction of which is servo-linked with the direction of communication, and wherein one of the two optical devices is also used to form a transmission channel for the initialization, then for the communication in the direction of communication.

Advantageously, the first and second optical channels process, in reception, the same signals coming from the same transmission channel of the remote station.

To enable good coverage of space, in minimizing the blind angles of transmission, the transmission/reception stations are preferably provided with wide-angle type optical systems and have an approximately hemispherical aperture.

In a supplementary way, when the tracking function is fulfilled by the same system, one of the optical devices is also used for this function.

Advantageously, the transmission channel of each optical system comprises focus checking and control means that check the direction of transmission of the optical beam. It also advantageously includes an optical deflector belonging to the group including acousto-optical deflectors and galvanometrical mirrors, upline from said focus checking and control means, and is preferably illuminated by a source constituted by one or more laser beams.

In an advantageous embodiment, the wide-field receiver optical channel for the initialization is located in a bypass on the optical device providing for the transmission and has a CCD detector.

Preferably, the optical device providing for the reception of the contents of the communication includes at least one highly sensitive fast optical sensor belonging to the group comprising photodiodes, avalanche photodiodes and photomultipliers.

The invention also relates to a method for establishing communication by means of a system such as the one described here above, wherein said method comprises the following steps:

a first target designation step in which the calling station sends a first initialization optical signal in a predetermined search field presumed to include the called station;

a second iterative step of bilateral acquisition in which each of the stations, the called station and the calling station, after receiving an initialization optical signal sent by the other station, sends back a new initialization signal covering a reduced transmission field, said second iterative step being performed until the obtaining of a predetermined precision of directional acquisition between said stations;

a third step of interstation communication, wherein said stations exchange useful data, each of the stations carrying out, in reception, firstly the reception of the useful signals through said second optical channel for receiving the contents of the communication and, secondly, the renewal of the tracking operation through said first optical channel for the initialization and tracking, in space, of the direction of communication.

Advantageously, said first target designation step comprises a process of optical beam scanning by the calling station, to scan a search field.

Preferably, in the case of the use of a CCD detector in the receiving optical channel of initialization, the precision of acquisition sought in the determining of the direction during the second iterative step of the method is of the order of some pixels of said CCD detector In certain embodiments, the renewal of the tracking during the third step of interstation communications is done with path information elements given by means external to said optical linking system.

BRIEF DESCRIPTION OF THE DRAWINGS

Other features and advantages of the invention shall appear from the following description of some preferred embodiments of the invention, given by way of a non-restrictive illustration, and from the appended drawings, of which.

DESCRIPTION OF THE PREFERRED EMBODIMENT

Figure 1:
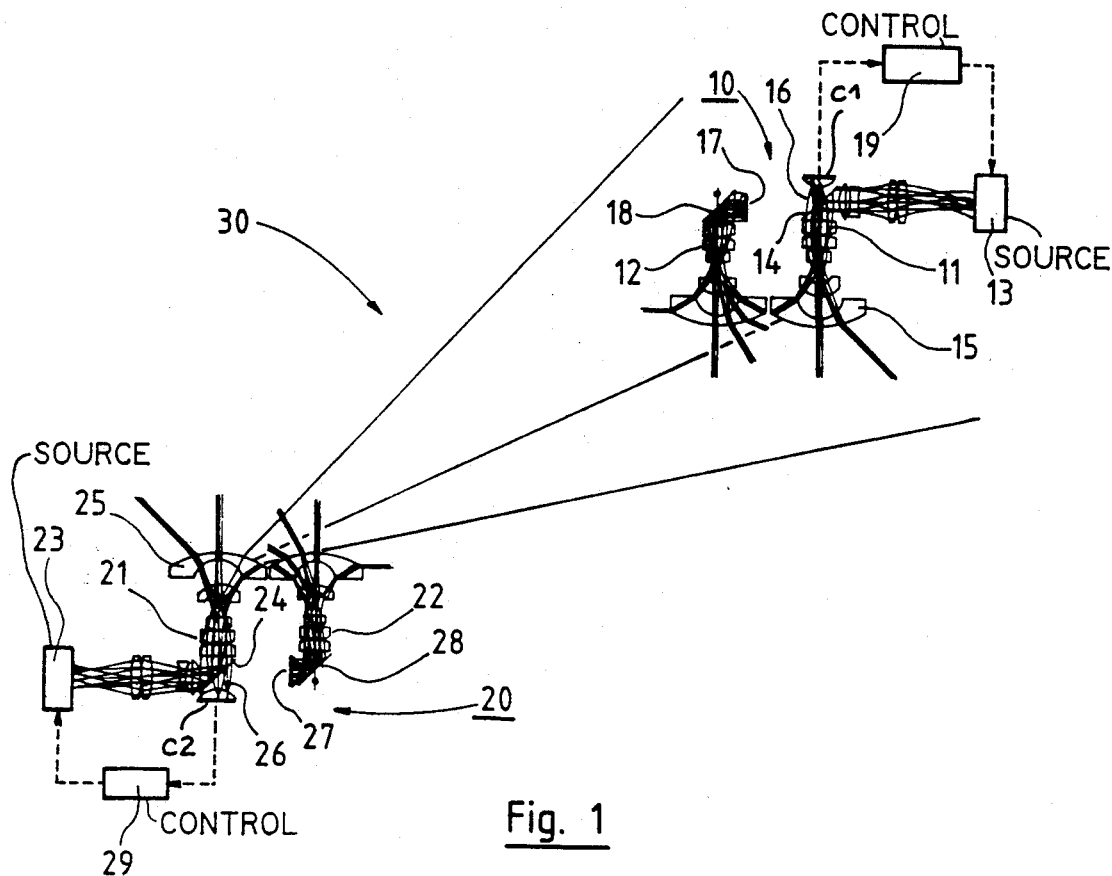
FIG. 1 gives a schematic view of the essential, constituent elements of the optical assembly of a communications system for aircraft according to the invention.

As shown in FIG. 1, the invention relates to a system 30 of optical linking between two remote stations 10, 20. Each of the remote stations may be, for example, an aircraft. In the embodiment shown, the station 20 may also be a ground station communicating with an aircraft 10. Each of the stations 10, 20 respectively is provided, symmetrically, with two twinned optical devices 11, 12 and 21, 22 respectively. Each of the first optical devices 11, 21 of the stations 10, 20 respectively cooperates with a source 13, 23 for the transmission of the communication and with a detector $C_1$, $C_2$ for the initialization. The optical signals transmitted are reflected by separator mirrors 14, 24 towards the wide-angle objective 15, 25 of each of the optical systems 11, 21.

As described in greater detail here below, the optical transmission sources 13, 23 may transmit wide (wide-field) beams or narrow (narrow-field) pencil beams towards the remote station. They are associated, in the optical devices 11, 21, with means to orient the direction of the transmitted beam which, depending on the phases, permit a scanning of the field of view (calling station in initialization phase) or a precise aiming of the transmission (with the called station in a responding or communicating phase and the calling station in a communicating phase).

The reception of the signals is done by means of two distinct optical channels a first optical reception channel for the initialization, in space, of the direction of communication; in the embodiment shown in FIG. 1, this first channel 16, 26 partially uses the first optical device 11, 21 already used for the transmission;

a second optical channel to receive the contents of the communication received, using the second receiving optical device, 12 and 22 respectively.

The tracking, namely the updating, of the direction of communication during this communication, is done either through the receiver channel used for the initialization or through the communications reception channel.

The initialization channel is used to detect a call from a remote station and then, should it be used also in tracking mode, for the continuous acquisition, verification and correction of the aiming of the response transmissions towards the remote station. The separator mirror 14, 24 separates the transmission channel from the reception channel associated with it in this first device. Control means 19, 29 provide for the servo-linking of the direction of transmission of the source 13, 23 as a function of the data given by this reception channel 16, 26 and of the transmission instructions. Naturally, the optical tracking channel can also be placed on the other optical device 12, 22 in a bypass of the channel for receiving the contents of the communication. A device can also be contrived where this optical tracking channel is in a distinct optical channel. Those skilled in the art will easily identify the technological components that can be used for the optical assembly.

The two reception channels of an optical system of one of the stations 10, 20 process the signals coming from one and the same transmission channel of the remote station 20, 10 respectively or, possibly, coming from the transmission channels of several remote stations, in the event of multiple communications liable to be received in a time-sharing mode.

The optical devices 12, 22 used for the reception of the communications include optical elements 17, 27 forming fast opto-electronic transducers. To this end, a moving mirror or set of moving mirrors 18, 28 sends on the received optical beam towards the transducers 17, 27 respectively, which may be linear (linear arrays of photodiodes) or take the form of individual units (photodiodes).

Advantageously, each of the two optical devices 11, 12; 21, 22 fitted into each station comprises a fish-eye type wide-angle objective. The sensor $C_1$, $C_2$ of the initialization channel, which can also be used for the tracking, may be a CCD type fast imager that can be windowed and has a large number of pixels enabling the localizing of the other party at a high rate (100 to 1000 Hz). The transducer 17, 27 of the main reception channel 12, 22 is constituted by one or more fast sensors (or arrays of sensors), for example of the photodiode, avalanche photodiode, or photomultiplier type.

Each device preferably covers a half space in the reference system of the station (for example, in the aircraft reference system). The entire reception field may be covered by one or more one-directional or two-directional fast mirror type devices 14, 24, 18, 28. The fish-eye objective 15, 25 of the optical device for transmission and reception in watching mode (initialization) has an image field equal to or greater than the image field of the optical device 22 for the reception of the communications.

Figure 2:
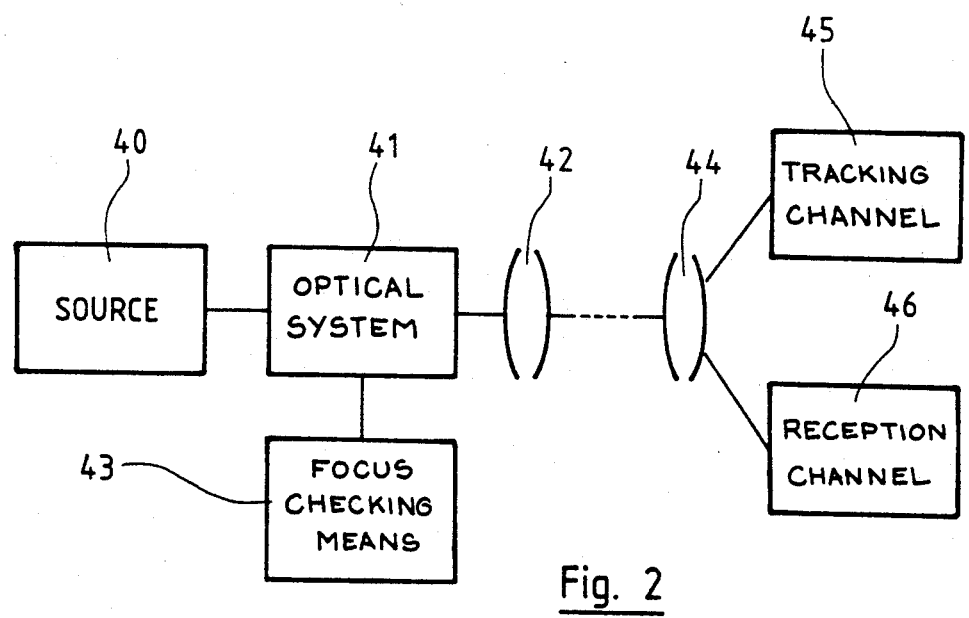
FIG. 2 gives a schematic view of the mode of integration of the various functional modules of the invention capable of cooperating with the optical assembly of FIG. 1.

FIG. 2 shows the functional diagram of the complete optical assembly, in steady operation after directional aiming, for example from the station 20 towards the station 10. The source 40 is constituted by one or more laser beams. The laser beams go through one or more deflectors in the optical system 41 which provides for the focusing of the beam in the image plane of the fish-eye objective. The deflector or deflectors are, for example, of the acousto-optical type or constituted by a galvanometrical mirror, servo-controlled by direction and focus checking means 43. A position of the focusing point in the plane of the fish-eye objective corresponds to an angle of deflection of the beam at an output of the fish-eye objective. The beam or beams at the output of the device will have a direction and a divergence that is a function of the position and size of the spot in the image plane. The focus checking means can be used, as the case may be, for simultaneous addressing in one or more directions so as to enable a large number of simultaneous communications with different remote stations. In a known way, the focus checking means may be any means, notably computer-controlled means, adapted to an optical system with variable focusing of the retractable, movable divergent lens type. After deflection and focusing, the beam goes through the optical system 42, travels in space and ends in the receiver station in the optical reception system 44 for transmission to the two reception channels 45, 46 for tracking, direction of communication and for reception of the useful communication signal respectively. This optical assembly can be replicated identically in the reverse direction.

For certain applications, the communication may be one-directional: in this case the receiver is simply associated with means for the transmission of a positioning signal that enables aiming and directional tracking by the transmitter station.

Whatever may be the embodiment, the invention has the advantage of providing almost instantaneous communication because the transmission system comprises practically no mechanical parts, or even no such parts whatsoever.

Figure 3:
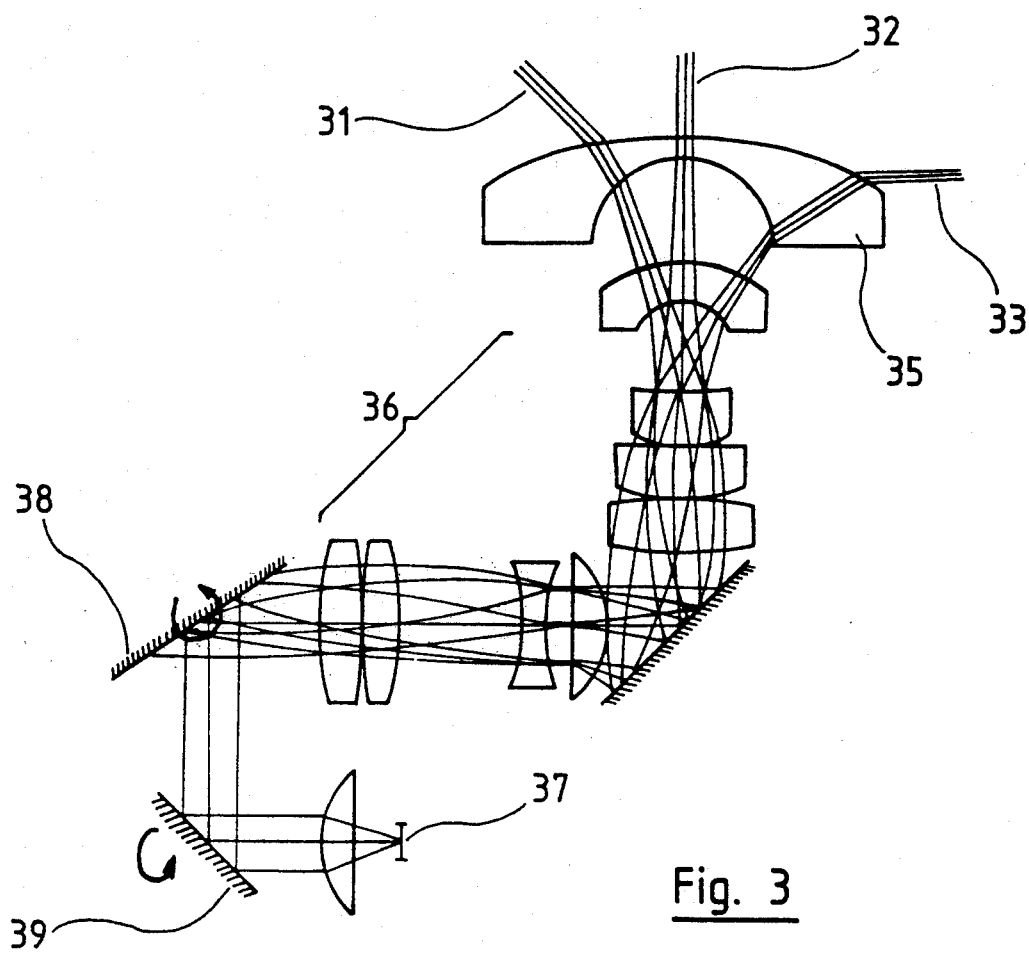
FIG. 3 gives a schematic view of an embodiment of an optical channel for the reception of useful signals, that can be used in a system according to FIGS. 1 or 2.

FIG. 3 illustrates an embodiment of the optical channel 46 (FIG. 2) for the reception of the useful signal. The incident beam 31 or 32 or 33 according to the direction of communication is focused through the fish-eye objective 35 towards the set of reception lenses 36. The beam reaches an individual photodiode 37 after reflection on two pivoting mirrors 38, 39, respectively servo-controlled along two orthogonal directions as a function of the direction of communication to maintain the image formed by the incident beam on the photodiode.

FIG. 1 illustrates another possibility of reception of the useful signal, in which the transducer of the optical devices 12, 22 for the reception of the useful signal is constituted by a linear sensor working in cooperation with a single mirror 18, 28 for scanning in the direction perpendicular to the photodiode array.

Figure 4:
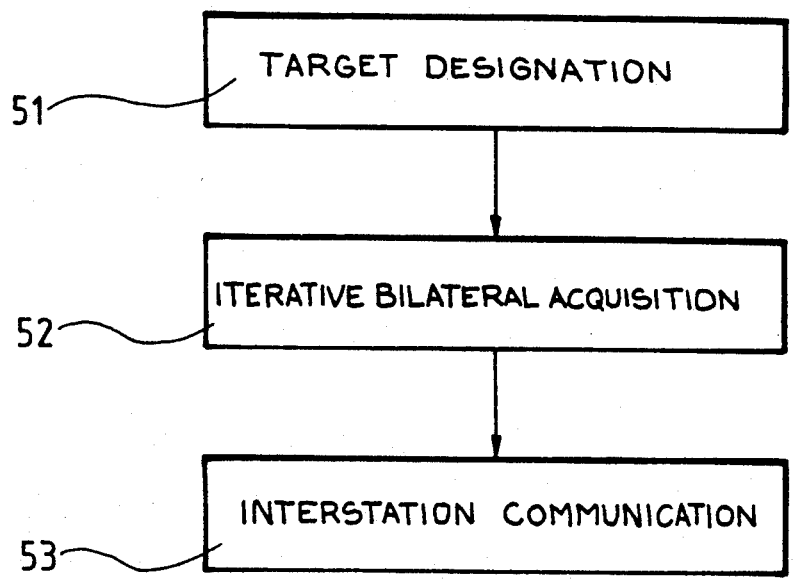
FIG. 4 represents the sequencing of three steps of a method of setting up communication according to the invention.

As shown schematically in FIG. 4, the communication is set up during a process for setting up communication, comprising the following three steps:
target designation (51),
iterative bilateral acquisition (52),
communication proper (53).

The transmission step 51 for the target designation is done on the basis of a pre-designation of mean quality. The greater this quality, the greater will be the distance at which it will be possible to do the designation, and the shorter will be the time necessary. For example, modes of designation have been contrived as a function of ranges of fields:
wide field (of the order of 200 mrd),
mean field (of the order of 100 mrd),
narrow field (of the order of 10 mrd).

These fields are the transmission fields. The calling party transmits in the mode corresponding to the quality of pre-designation. In certain configurations, it is possible to envisage a scanning device to extend the search field. The called party then receives a signal from his imager.

The signal received by the called party enables the caller to refine the pre-designation during the iterative bilateral acquisition step 52. A signal re-transmitted by the called party in a mean field towards the caller enables the latter, in turn, to reduce his field of transmission. The designation phase is ended when the quality of the designation is of the order of some pixels of the CCD sensor of each of the initialization channels of the communicating stations. When this quality of designation is achieved, both parties go into the "narrow-field" mode and increase the renewal frequency for the tracking by a windowing of the imager (for example, up to 1000 Hz).

In the communication phase proper, referenced 53, the deflectors (for example fast mirrors) of the reception channels of the useful communication position, in each receiver, the image of the laser beam received on the array of photodiodes, according to a field of vision coherent with the precision of the photodiodes.

For example, the device may be applied to SPACE/SURFACE, SPACE/AIR, AIR/SURFACE or SURFACE/SURFACE communications, and each type of communications may require a different number of devices.

Furthermore, the device planned in each station constitutes a narrow-field illuminator with a wide range of play and fast aiming.

What is claimed is:

1. A system of optical communication between a transmission station and a reception station, at least one of the transmission station or reception station being aboard an aircraft, wherein:
the transmission station comprises a transmission channel for an initialization of a direction of communication, and then for a transmission of a communication data in the direction of communication;
the reception station comprises:
a first optical reception channel for the initialization of the direction of communication, comprising a wide-field objective and a detector enabling the direction of communication with the transmission station to be determined; and
a second optical reception channel to receive contents of the communication data with the reception station, a receiving direction of which is servo-linked with the direction of communication.

2. The system according to claim 1, wherein the first and second optical reception channels process the same signals coming from the same transmission channel of the transmission station.

3. The system according to claim 1, wherein in the first optical reception channel the wide-field objective is of the fish-eye type, and the second optical reception channel comprises a wide-field afocal objective associated with a deflection unit, these objectives having an approximately hemispherical aperture.

4. The system according to claim 1, wherein the transmission channel further comprises focus checking and control means that check the direction of transmission of the communication.

5. The system according to claim 4 wherein, upline from said focus checking and control means, said transmission channel further comprises at least one optical deflector belonging to the group consisting of acousto-optical deflectors and galvanometrical mirrors.

6. The system according to claim 1, wherein the transmission channel of said transmission station is illuminated by a source constituted by one or more laser beams.

7. The system according to claim 1, wherein the detector of the first optical reception channel for initialization is a CCD detector forming an imager with a plurality of pixels.

8. The system according to claim 1, wherein said second optical reception channel for the reception of the contents of the communication data includes at least one fast optical sensor belonging to the group consisting of photodiodes, avalanche photodiodes and photomultipliers.

9. A method for establishing optical communication between a transmission station and a reception station, wherein at least one of the transmission station or reception station is aboard an aircraft, comprising the steps of:

a first designation step in which the transmission station transmits a first initialization optical signal in a predetermined search field to include the reception station;

a second return designation step in which the reception station sends a second initialization optical signal to the transmission station in response to the first initialization optical signal;

a third iterative step of bilateral acquisition in which the transmission station and the reception station, after receiving the respective first and second initialization optical signals sent by the other station, send back new initialization signals covering a reduced transmission field, said second iterative step being performed until a predetermined precision of directional acquisition between said transmission and reception stations is obtained; and a fourth step of interstation communication, wherein said transmission and reception stations exchange useful data, each of the transmission and reception stations carrying out, in reception, firstly reception of the useful data through a second optical channel for receiving contents of the communication and, secondly, renewal of a tracking operation through a first optical channel for the initialization and tracking, in space, of the direction of communication.

10. The method according to claim 9, wherein said first designation step comprises a process of optical beam scanning by the transmission station.

11. The method according to claim 9, wherein the renewal of the tracking in the fourth step of interstation communications is done with path information elements given by means external to said optical communication system.

* * * * *